US011048539B2

(12) United States Patent
Shantamurty

(10) Patent No.: US 11,048,539 B2
(45) Date of Patent: Jun. 29, 2021

(54) TRANSITIONING VIRTUAL MACHINES TO AN INACTIVE STATE

(71) Applicant: HEWLETT PACKARD ENTERPRISE DEVELOPMENT LP, Houston, TX (US)

(72) Inventor: Rupesh Shantamurty, Bangalore (IN)

(73) Assignee: Hewlett Packard Enterprise Development LP, Houston, TX (US)

(*) Notice: Subject to any disclaimer, the term of this patent is extended or adjusted under 35 U.S.C. 154(b) by 271 days.

(21) Appl. No.: 15/907,227

(22) Filed: Feb. 27, 2018

(65) Prior Publication Data

US 2019/0265998 A1   Aug. 29, 2019

(51) Int. Cl.
*G06F 9/46* (2006.01)
*G06F 9/455* (2018.01)

(52) U.S. Cl.
CPC ............ *G06F 9/45558* (2013.01); *G06F 2009/45575* (2013.01); *G06F 2009/45591* (2013.01); *G06F 2009/45595* (2013.01)

(58) Field of Classification Search
CPC ......... G06F 9/4558; G06F 2009/45575; G06F 2009/45591
See application file for complete search history.

(56) References Cited

U.S. PATENT DOCUMENTS

| | | | |
|---|---|---|---|
| 6,449,253 B1* | 9/2002 | Ott | H04L 12/5602 370/231 |
| 6,697,373 B1* | 2/2004 | Sandstrom | H04J 3/085 370/401 |
| 7,725,559 B2 | 5/2010 | Landis et al. | |
| 8,175,863 B1 | 5/2012 | Ostermeyer et al. | |
| 10,263,870 B2* | 4/2019 | Lang | H04L 41/0896 |
| 2005/0125580 A1* | 6/2005 | Madukkarumukumana | G06F 9/4812 710/200 |
| 2009/0144577 A1* | 6/2009 | Sarker | G06F 1/3225 713/340 |
| 2010/0070784 A1 | 3/2010 | Gupta et al. | |

(Continued)

OTHER PUBLICATIONS

Canonical Ltd., "libipq—iptables userspace packet queuing library," 2010, pp. 1-4 (online), ubuntu manuals, Retrieved from the Internet on Apr. 18, 2018 at URL: <manpages.ubuntu.com/manpages/precise/man3/libipq.3.html>.

(Continued)

*Primary Examiner* — Camquy Truong
(74) *Attorney, Agent, or Firm* — Hewlett Packard Enterprise Patent Department

(57) ABSTRACT

An example computer system is provided that utilizes an agent to operate autonomously in transitioning virtual machines between an active state and an inactive state. In an implementation, a processor executes instructions to cause a computer system to implement a virtual machine communication interface, and to host a virtual machine. In some examples, the processor executes instructions to cause the computer system to utilize an agent to operate autonomously in transitioning the virtual machine from an active state to an inactive state after a period of inactivity. In other examples, the processor may execute instructions to cause the computer system to transition the virtual machine from the inactive state back to the active state upon receiving a data packet targeted for the inactive virtual machine.

19 Claims, 4 Drawing Sheets

(56) References Cited

U.S. PATENT DOCUMENTS

| | | | | |
|---|---|---|---|---|
| 2011/0268113 A1* | 11/2011 | Suzuki | ............... | G06F 9/54 |
| | | | | 370/389 |
| 2014/0165060 A1 | 6/2014 | Muller et al. | | |
| 2015/0039764 A1 | 2/2015 | Beloglazov et al. | | |
| 2016/0139948 A1* | 5/2016 | Beveridge | ............ | G06F 9/5005 |
| | | | | 718/1 |
| 2017/0149666 A1* | 5/2017 | Kiykioglu | ............... | H04L 47/27 |
| 2017/0346944 A1* | 11/2017 | Rist | ................ | H04M 3/42263 |
| 2018/0013651 A1* | 1/2018 | Lang | ................ | H04L 69/324 |

OTHER PUBLICATIONS

Jack Wallen, "The Five Fastest-booting Linux Distributions," Tech Republic, Dec. 12, 2011, pp. 1-12 (online), CBS Interactive, Retrieved from the Internet on Apr. 18, 2018 at URL: <techrepublic.com/blog/five-apps/the-five-fastest-booting-linux-distributions/>.

Wikipedia, "Wake-on-LAN," Jan. 29, 2018, pp. 1-11 (online), Retrieved from the Internet on Apr. 18, 2018 at URL: <en.wikipedia.org/w/index.php?title=Wake-on-LAN&oldid=822917444>.

* cited by examiner

TRANSITIONING VIRTUAL MACHINES TO AN INACTIVE STATE

BACKGROUND

Virtual machines are tools for enabling computing environments. Increasingly, virtual machines are dedicated for specific tasks or functions, many of which are specialized. As a result, the volume of virtual machines operating in a given network environment can increase rapidly, particularly with inclusion of numerous virtual machines which are dedicated for specific tasks or otherwise specialized.

DETAILED DESCRIPTION

Figure 1A:
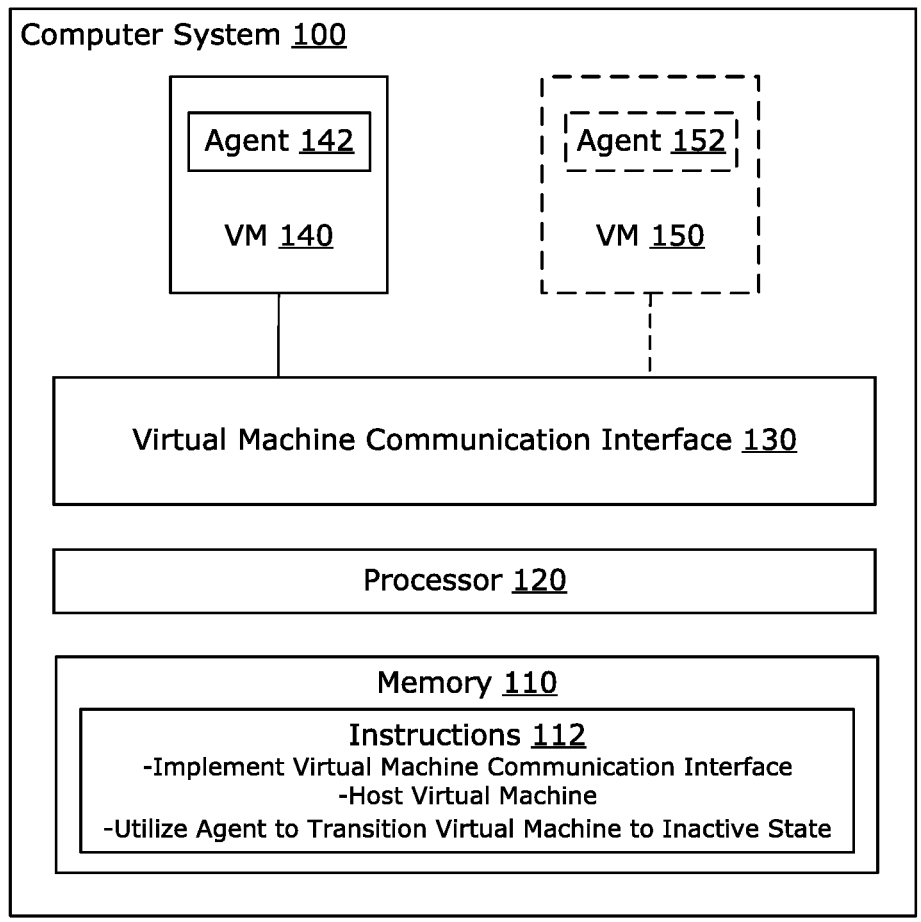
FIG. 1A illustrates an example computer system that utilizes agents to operate autonomously in transitioning a virtual machine to an inactive state.

An example computer system is provided that utilizes an agent to operate autonomously in transitioning virtual machines to an inactive state. In some examples, a computer system includes a memory to store a set of instructions and a processor to execute instructions for implementing a virtual machine communication interface and for hosting a virtual machine. The processor may execute instructions to utilize an agent to operate autonomously in transitioning the virtual machine from an active state to an inactive state after a period of inactivity. Additionally, the processor may execute instructions to transition the virtual machine from the inactive state to the active state upon receiving a data packet targeted for the inactive virtual machine.

In some variations, an example computer system utilizes an agent to operate autonomously on a virtual machine that the computer system is hosting. The agent operates autonomously to transition the virtual machine from an active state to an inactive state after a period of inactivity. Additionally, the computer system transitions the virtual machine from the inactive state back to the active state when a data packet is detected that is targeted for the virtual machine.

Still further, in other examples, a computer system hosts multiple virtual machines, where each virtual machine is operable to communicate with a virtual machine communication interface. An agent can be provided for each of the multiple virtual machines, where each agent operates to autonomously transition its respective virtual machine from an active state to an inactive state after a period of inactivity. Additionally, the computer system transitions the respective virtual machine from the inactive state back to the active state when a data packet is detected that is targeted for the respective virtual machine.

While some examples are provided for computer systems, other examples may be implemented using instructions stored in computer-readable memory and executable by a processor. Still further, other examples may be implemented as operations, implemented by a computer system as described. In various examples, a computer system can include processing resources and memory, such as provided by a server, terminal, network appliance, workstation or combination of such devices. Memory, processing, and network resources may all be used in connection with the establishment, use, or performance of any example described herein (including with the performance of any method or with the implementation of any system).

Machines shown or described with figures below provide examples of processing resources and computer-readable mediums on which instructions for implementing examples described herein can be carried and/or executed. In particular, the numerous machines shown with examples described herein include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

FIG. 1A illustrates an example computer system for autonomously transitioning a virtual machine to an inactive state. In particular, an example computer system 100 provides a network environment which can operate as a service on which other applications and services may be implemented. By way of example, the computer system 100 may provide an Infrastructure as a Service (IAAS) platform. In providing the network environment, the computer system 100 can host multiple virtual machines, including virtual machines that have intermittent periods of down-time. For example, the computer system 100 can host virtual machines that are specialized or dedicated for specific purposes that limit the respective virtual machine's period of activity to discrete time intervals where conditions or events give rise to utilization of purposed virtual machines. With reference to an example of FIG. 1A, the computer system 100 may host virtual machine 140 and virtual machine 150. In an illustration, the virtual machine 140 may be provisioned to function as a web server, and the virtual machine 150 may be provisioned to function as a database server.

In some examples, the computer system 100 includes a memory 110 and a processor 120 which combine to provide a virtual machine environment, on which virtual machines 140, 150 can be hosted. The memory 110 can include, for example, a memory component (e.g., DRAM memory component) that stores a set of instructions 112 for use by the computer system 100. The processor 120 can execute the set of instructions 112 to provide the virtual environment, and to host multiple virtual machines. By way of example, the environment provided by computer system 100 can include a hypervisor, which can create and operate virtual machines 140, 150 for a variety of purposes and tasks.

Additionally, in some examples, the computer system 100 includes a virtual machine communication interface 130, as well as agents 142, 152 for corresponding virtual machines 140, 150. The virtual machine communication interface 130 can interact with agents 142, 152, to autonomously transition corresponding virtual machines 140, 150 from active states to inactive states, and/or from inactive states to active states. The agents 142, 152 can be initiated, or otherwise generated by, for example, the hypervisor of the computer system 100, to implement policies that regulate the operational state of the corresponding virtual machines 140, 150 based on a condition or event of inactivity. In some examples, each agent 142, 152 may be implemented as a script which executes to perform monitoring actions when the corresponding virtual machine 140, 150 is hosted on the computer system 100. By way of example, the agent(s) 142, 152 can be implemented as a script that detects and measures CPU idle time for a corresponding virtual machine. As another example, the agent(s) 142, 152 can monitor network activity on select ports that are used by corresponding virtual machines 140, 150. In some examples, the agent(s) 142, 152 perform operations of monitoring for, or otherwise detecting, inactivity and then communicating with the virtual machine communication interface 130 when the corresponding virtual machine(s) 140, 150 is detected as inactive. Still further, the agents 142, 152 can respond to detecting inactivity (based on the policy associated with the agent) by transitioning the corresponding virtual machine from an active state to an inactive state.

As described by examples, the virtual machine communication interface 130 can communicate with the agents 142, 152 of individual virtual machines 140, 150 hosted on the computer system 100 to detect when the individual virtual machines are transitioned to inactive states. The virtual machine communication interface 130 may be implemented using components that link the computer system 100 to an external network (e.g., set of network interfaces, routing tables, etc.). In some examples, the virtual machine communication interface 130 can correspond to a program, process, set of processes, or code segment that implements operations to control virtual machines. Still further, the virtual machine communication interface 130 can be implemented as a self-contained program or component, or in conjunction with other network resources that manage virtual machines. For example, virtual machine communication interface 130 can include a program or process that runs along with or as a plugin to the hypervisor to control the operational states of virtual machines hosted by the computer system 100. In some cases, the virtual machine communication interface 130 may be deemed a network plugin module, and may operate at OSI (open systems interconnection model) layer 3, that is, the IP layer or network layer.

In variations, the determinations to transition select virtual machines to inactive states can be implemented using distributed (or agent-specific) logic, as well as group logic. In order to determine whether a virtual machine has experienced a sufficient period of inactivity to transition the virtual machine from an active state to an inactive state, the agents 142, 152 operating on the virtual machines 140, 150 monitor data related to the virtual machines according to a policy or predetermined set of rules associated with the agents 142, 152, respectively. Such data sets can include, for example, data generated, acquired, analyzed, collected or logged by the computer system 100 or by the virtual machines in the network environment, such as data logged for system management of an operating system (e.g., syslog data). For example, data can include general information, such as a measure of unused CPU capacity (e.g., CPU idle time), as well as specific information, such as network activity on a particular port (e.g., port 8080), or any combination thereof.

In some examples, agents 142, 152 can implement different rule sets for purpose of monitoring and detecting when their respective virtual machines 140, 150 are to be transitioned to inactive states. For example, the agent 152 may include a predetermined set of rules to transition the virtual machine 150 from an active state to an inactive state when (i) the CPU idle time of the virtual machine 150 stays at or above 90%, and/or (ii) no network activity is detected on a relevant port(s). Further, the rule sets can be specified with threshold timing conditions (e.g., 2 hours).

Further, individual virtual machines can include different rules sets or logic for triggering when the respective virtual machines are to be transitioned to the inactive states. For example, the virtual machine 140 may monitor for inactivity in accordance with a first set of rules (e.g., activity on a first port that the virtual machine 140 uses), and a second virtual machine 150 may monitor for inactivity in accordance with a second set of rules (e.g., monitor for activity on a second port that is not the first port). Moreover, the determination of which port to monitor may exclude ports which are unreliable markers for inactivity. For example, the rule sets that are implemented by individual virtual machines 140, 150 may exclude monitoring of Simple Network Management Protocol ("SNMP") ports because such ports are often active irrespective of whether a corresponding virtual machine is idle or active. In this way, administrators may exclude certain parameters in favor of other parameters that aid agents in optimizing resources and the overall operation of the computer system 100.

The virtual machine communication interface 130 can also include a component that operates as a pluggable module to an existing virtual machine infrastructure or as a network function virtualization module ("NFV") of a software-defined network switch ("SDN"). In other variations still, the virtual machine communication interface 130 may include a component that operates as part of an open source next generation firewall/gateway solution.

As described, examples improve efficiency and utilization of the computer system 100 by eliminating "phantom" virtual machines that are operational yet remain unutilized. Among other benefits, examples address virtualization sprawl resulting from networks that increasingly rely on virtual machines for specific functions and tasks. The computer system 100, for example, can be implemented to enable network administrators to manage a significantly larger number of virtual machines, thus mitigating virtualization sprawl and enabling better management of network environments that rely on virtual machines. In addition, the elimination of phantom virtual machines may increase system security by reducing the attack surface area for malicious intruders. As further described, examples monitor virtual machines operating in a given network environment, and further inactivate individual machines when periods of inactivity are detected based on policies associated with the agents operating on the virtual machines, respectively.

In some variations, the determination to transition one or multiple virtual machines to the inactive state can be based on group-level logic. For example, the individual agents 142, 152 can operate to gather information for a separate engine that determines when individual virtual machines 140, 150 are to be transitioned to the inactive state. Analysis engines can be implemented using instructions stored in computer-readable memory and executable by a processor. An analysis engine can apply global rules or logic to determine when virtual machines are to be inactivated. When such determinations are made, the engine can communicate to the agents to transition the respective virtual machines to the inactive state. Depending on implementation, the analysis engine can be implemented as a separate component within or external to the computer system 100.

Figure 1B:
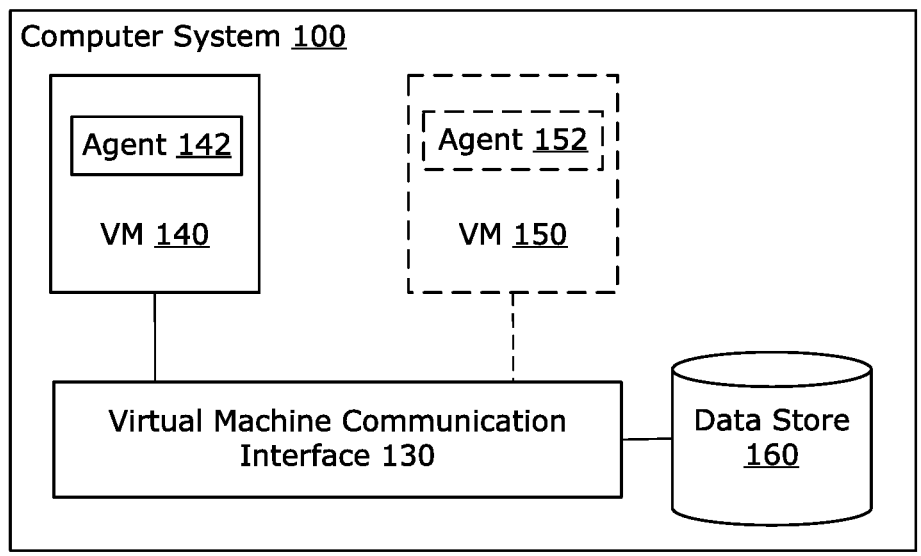
FIG. 1B illustrates an example of a virtual machine communication interface implemented in a single host architecture.

FIG. 1B illustrates another example of a computer system that can transition virtual machines between active and inactive states. In a variation of FIG. 1B, the virtual machine communication interface 130 includes or communicates with a data store 160 (e.g., database, table, etc.) that associates identifiers of hosted virtual machines with their respective current operational state, where the operational state may include at least one of (i) an active state, meaning the virtual machine is active and performing operations and tasks, and (ii) an inactive state, meaning little to no activity is performed by the virtual machine. For example, upon detecting an inactive virtual machine, the corresponding agent can send a notification to the virtual machine communication interface that includes an identifier of the inactive virtual machine.

In variations, the data store 160 keeps a roster of inactive virtual machines. For example, the virtual machine communication interface 130 can monitor or otherwise detect those virtual machines that transition from an active state to an inactive state. Each of the active or inactive states may be defined by predetermined criteria, such as a duration of time since a last activity was performed, or a duration in which only a specific type of activity (e.g., health check) is performed. When an inactive virtual machine is detected, the virtual machine communication interface 130 can create or modify a record for that virtual machine with the data store 160.

In some examples, the agents 142, 152 can also specify transitioning back data when notifying the virtual machine communication interface 130 of an inactive virtual machine. The virtual machine communication interface 130 can store the transitioning back data with the data store 160. The virtual machine communication interface 130 can use the transitioning back data to enable the computer system 100 to transition its respective virtual machines back to the active state.

In this way, the virtual machine communication interface 130 can also perform lookup operations to determine inactive virtual machines. The virtual machine communication interface 130 can detect incoming data packets for virtual machines 140, 150, and respond by determining whether the targeted virtual machine of the data packet is inactive, using the data store 160. In response to detecting (or receiving) an incoming data packet, the virtual machine communication interface 130 can trigger a corresponding target virtual machine to operate in a state in which the data packet can be received. As described with some examples, the virtual machine communication interface 130 can trigger a target virtual machine by instructing the agent 142, 152 of the target virtual machine to, for example, transition into an active state (e.g., from a low-power or non-operational state), so that incoming data packets can be forwarded to the target virtual machine.

Thus, when an incoming packet is received or otherwise detected, the virtual machine communication interface 130 can perform a lookup operation to determine whether the target virtual machine for the incoming data packet is inactive. In some variations, when the virtual machine communication interface 130 determines the targeted virtual machine is inactive, it initiates a communication to trigger activation of that virtual machine. If the virtual machine communication interface 130 detects that the targeted virtual machine is active (or not inactive), the virtual machine communication interface 130 can forward or otherwise pass the incoming data packet to the targeted virtual machine.

Referring to FIG. 1B, upon receipt of the notification from the agent 142 the virtual machine communication interface 130 sends the data included in the notification to the data store 160 to be stored until the computer system 100 requires the VM 140 to be active.

The computer system 100 can also transition inactive virtual machines from the inactive state back to the active state. As discussed above, the computer system 100 may require inactive virtual machines to become operational in order to perform specific functions dedicated to those inactive virtual machines. In one example, the virtual machine communication interface 130 may receive a data packet from an external network targeted for the virtual machine 140. The virtual machine communication interface 130 may perform a lookup in the data store 160 to determine whether the data packet received by the virtual machine communication interface 130 targets the virtual machine 140. If the virtual machine communication interface 130 determines that the data packet targets the virtual machine 140, then the virtual machine communication interface 130 buffers the data packet and instructs the network resources (e.g., hypervisor) of the computer system 100 to transition the virtual machine 140 from the inactive state back to the active state. In addition, the computer system 100 may transition inactive virtual machines from the inactive state to the active state within a protocol timeout boundary to ensure that the data packet reaches its destination without requiring retransmission of the data packet or without resulting in rejection of the data packet.

Figure 2:
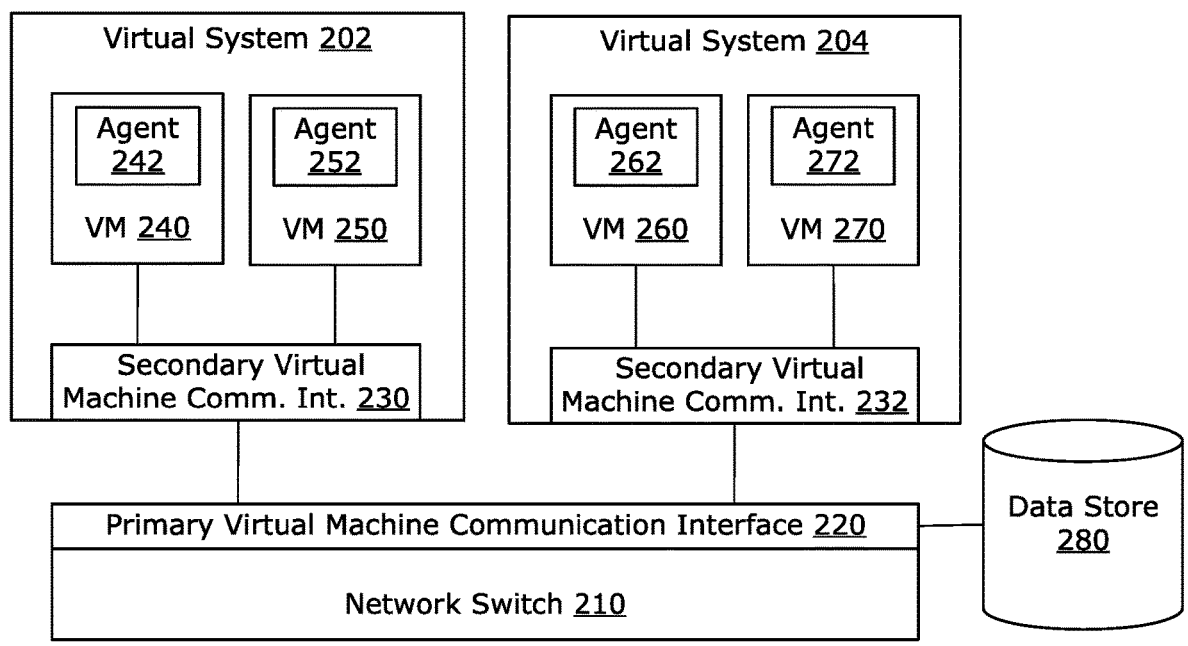
FIG. 2 illustrates an example of a virtual machine communication interface implemented in a distributed architecture.

FIG. 2 provides an example implementation of the virtual machine communication interface. In variations, as shown in FIG. 2, the virtual machine communication interface can operate in a distributed architecture as part of a network switch (e.g., software-defined network or "SDN" switch). The distributed architecture can include various hardware and software components for interconnecting multiple computer and/or virtual systems to enable communication and coordination between the systems. For example, as shown in FIG. 2, the virtual machine communication interface can be implemented as a network function virtualization module ("NFV") of the network switch 210, and may be distributed as multiple logical instances (e.g., primary virtual machine controller, secondary virtual machine controller, etc.).

In reference to FIG. 2, the network switch 210 enables communication and coordination between the virtual systems 202 and 204. The network switch 210 can be implemented as a software-defined network switch to centralize network intelligence between the various systems (e.g., 202, 204) connected to the network switch 210. The virtual systems 202, 204 may be provided as IAAS platforms from which various cloud applications and services may be implemented. In one variation, the virtual system 202 may be implemented as a private cloud that includes dedicated cloud resources, such as hardware and software components for maintaining a private network. Further, virtual system 204 may be implemented as a public cloud in which shared cloud resources are managed by a third party. In addition, the virtual systems 202, 204 may operate in coordination to provide hybrid cloud applications and services. Other variations of cloud computing systems as well as other individual virtual and computer systems, and combinations thereof, are also contemplated.

The distributed architecture, as shown in FIG. 2, provides users (e.g., administrators) with the option to shut down an entire system when all the virtual machines of that system are determined to be inactive. For example, agents 242, 252 may determine, respectively, that virtual machines 240, 250 are inactive, and send notifications to the secondary virtual machine communication interface 230, which may in turn forward the notifications to the primary virtual machine communication interface 220. The primary virtual machine communication interface 220 may then store the data included in the notifications for virtual machines 240, 250 in the data store 280. In this case, since all the virtual machines 240, 250 of the virtual system 202 are inactive, the primary virtual machine communication interface 220 can shut down the entire virtual system 202, further conserving the resources being utilized under the distributed architecture.

Figure 3A:
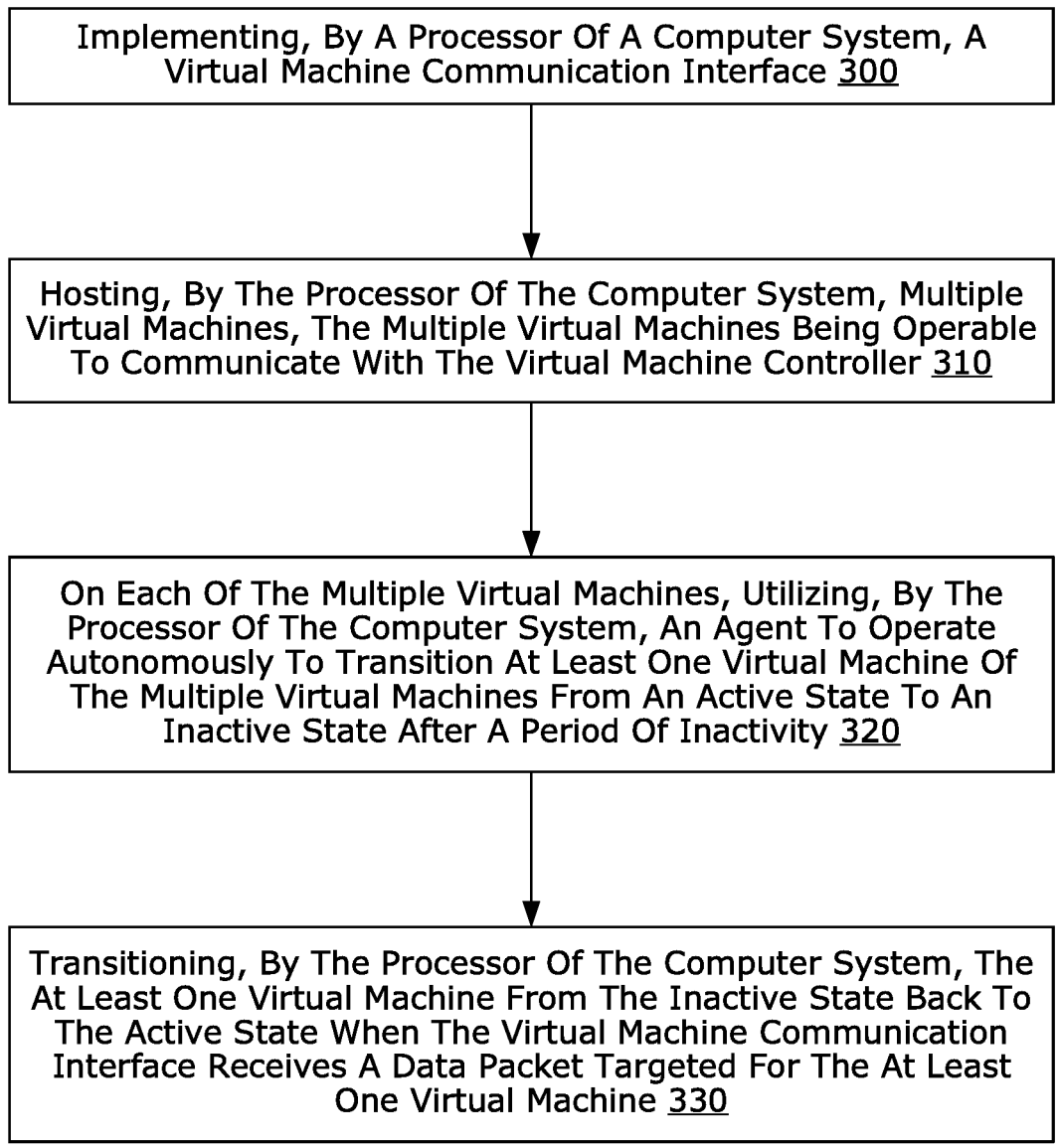
FIG. 3A and FIG. 3B illustrate an example method for autonomously transitioning multiple virtual machines between an active state and an inactive state.
Figure 3B:
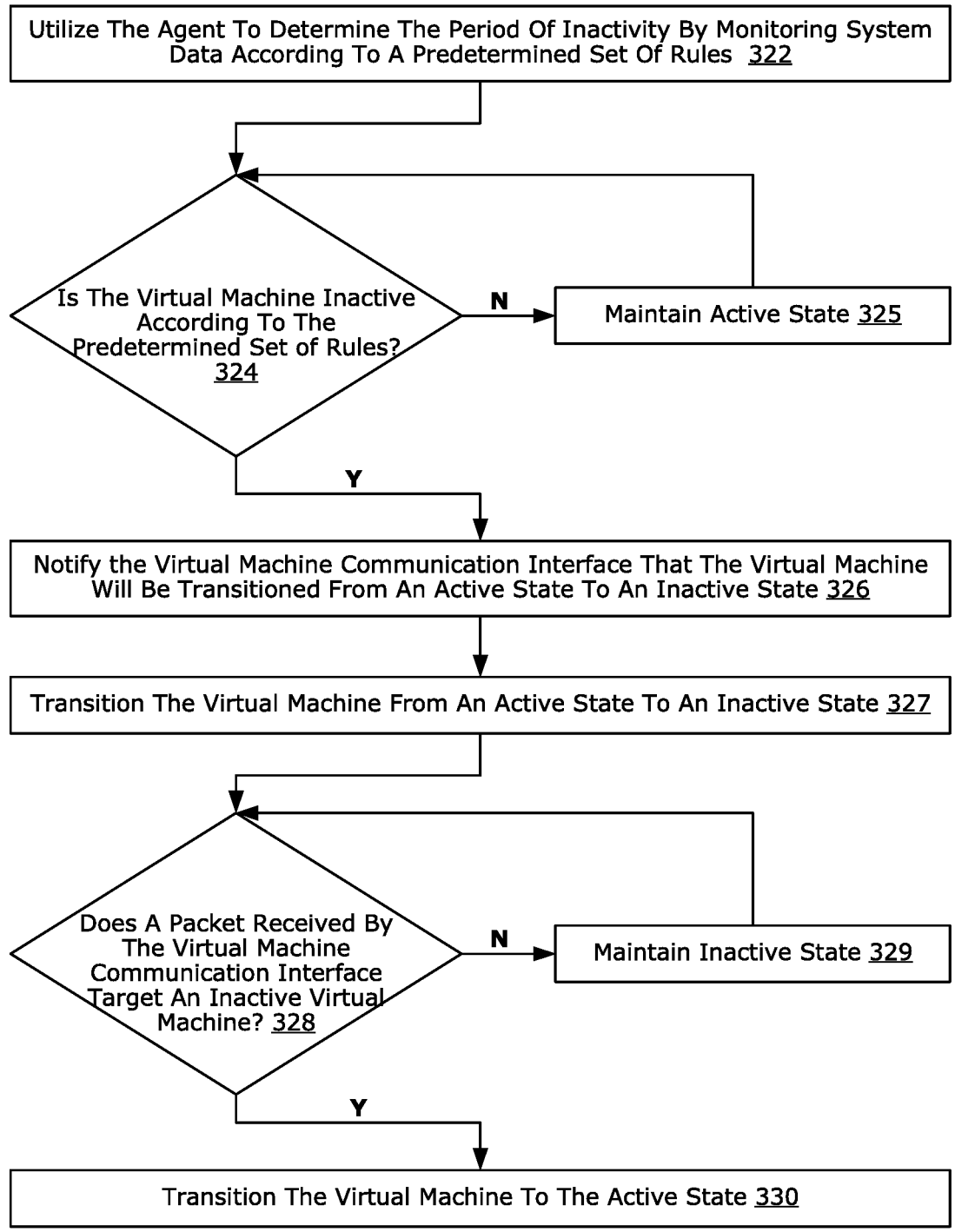

FIG. 3A and FIG. 3B illustrate example methods for autonomously managing multiple virtual machines. The example method such as described by the examples of FIG. 3A and FIG. 3B can be implemented using example systems, such as described with the examples of FIG. 1A through FIG. 2. Accordingly, reference is made to elements described with examples of FIG. 1A through FIG. 2 to illustrate components for implementing a block or sub-block being described in FIG. 3A or FIG. 3B.

As shown in FIG. 3A, the computer system may implement a virtual machine communication interface (300). The virtual machine communication interface enables communication between the virtual machines and the components of the computer system that host the virtual machines. As shown in FIG. 1A, the virtual machine communication interface 130 may operate as part of a single host architecture. Alternatively, as shown in FIG. 2, the virtual machine communication interface may operate as part of a distributed architecture that may include a primary virtual machine communication interface 220 and multiple secondary virtual machine communication interfaces 230, 232. In addition, the virtual machine communication interface maintains a database to store data to identify and transition back inactive virtual machines, and to perform look up operations for the transitioning back data to enable the computer system 100 to transition inactive virtual machines back to the active state.

The computer system may host multiple virtual machines (310). The computer system may provide a platform (e.g., private cloud) or may access a platform (e.g., public cloud) or any combination thereof (e.g., hybrid cloud) on which the multiple virtual machines may be implemented to provide various services and applications. In some instances, each of the virtual machines perform specific dedicated tasks.

In addition, the computer system may utilize agents on each of the multiple virtual machines to operate autonomously in transitioning the virtual machines from an active state to an inactive state after a period of inactivity (320). Each agent can be uniquely programmed for the particular virtual machine on which it operates. Referring to FIG. 2, the agents 242, 252, 262 and 272 can run on the virtual machines 240, 250, 260, 270, respectively, with each agent including its own unique script that includes a predetermined set of rules tailored for the specific dedicated function of each of the virtual machines. For example, the virtual machine 250 may experience a high volume of network traffic (e.g., web server) so that the predetermined set of rules that govern inactivity may differ from the predetermined set of rules that govern inactivity for the virtual machine 280, which may experience a lower volume of network traffic (e.g., database server).

Further, in reference to FIG. 3B, the computer system may utilize agents to determine whether the period of activity has occurred by monitoring data according to a predetermined set of rules. (322). For example, agents can monitor the system data of the virtual machines (e.g., CPU idle time, network activity on a port, etc.), where the type of system data monitored may vary for each virtual machine depending upon the dedicated task of each virtual machine (e.g., web server, database server, etc.) (324). If the data analyzed by an analytics engine and communicated to the agent does not satisfy the predetermined set of rules for the period of inactivity associated with the agent, then the agent does not alter the operational state of the virtual machine, which remains in its active state (325). If the data analyzed by the analytics engine and communicated to the agent does satisfy the predetermined set of rules for the period of inactivity associated with the agent, then the agent begins the process of powering down the virtual machine.

Before transitioning a virtual machine from an active state to an inactive state, the agent can send a notification to the virtual machine communication interface (326). In notifying the virtual machine communication interface, the agent sends data (e.g., configuration data, identifying data, etc.) needed to look up the virtual machine in the database and to activate the virtual machine when an incoming data packet targets the inactive virtual machine. The virtual machine communications interface maintains a data store, which can be located within the computer or virtual system (e.g., FIG. 1B) or outside the computer or virtual system (e.g., FIG. 2).

After notifying the virtual machine communication interface, the agent transitions the virtual machine from an active state to an inactive state (327). In some instances, as characterized by the example in FIG. 2, the agents 242, 252, operating on corresponding virtual machines 240, 250 within virtual system 202, determine that all of the virtual machines in the system are inactive. In such instances, the entire virtual system 202 may be transitioned from an active state to an inactive state.

During the course of its operation, the computer system may receive data packets targeted for a specific virtual machine (328). If the virtual machine communication interface determines that the data packet is not targeted for an inactive virtual machine, then the virtual machine communication interface can cause the data packet to be delivered to the targeted active virtual machine, in which case the inactive virtual machines chronicled in the data store remain in the inactive state (329). If the virtual machine communication interface determines that the data packet is targeted for an inactive virtual machine stored in the data store, then the virtual machine communication interface instructs the network resources of the computer system (e.g., hypervisor) to transition the virtual machine from the inactive state to the active state (330).

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mention of the particular feature. Thus, the absence of describing combinations should not preclude having rights to such combinations.

What is claimed is:

1. A computer system comprising:
   a memory to store a set of instructions;
   a processor to execute the set of instructions to cause the computer system to:
   implement a virtual machine communication interface;

host multiple virtual machines, the virtual machines being operable to communicate with the virtual machine communication interface;

utilize an agent to determine a period of inactivity of at least one virtual machine of the multiple virtual machines by monitoring system data of the at least one virtual machine according to a predetermined set of rules, the system data including CPU idle time and network activity on a port of the at least one virtual machine;

utilize an agent to operate autonomously on the at least one virtual machine to transition the at least one virtual machine from an active state to an inactive state after the period of inactivity of the at least one virtual machine;

transition the at least one virtual machine from the inactive state back to the active state when the virtual machine communication interface receives a data packet identifying data targeted for the at least one virtual machine;

if the data packet received by the virtual machine communication interface targets an inactive virtual machine, wherein the virtual machine is transitioned from the inactive state to the active state by causing the virtual machine communication interface to buffer the data packet and instruct a network resource to transition the virtual machine to the active state.

2. The computer system of claim 1, wherein the agent notifies the virtual machine communication interface before transitioning the virtual machine from the active state to the inactive state.

3. The computer system of claim 2, wherein the agent notifies the virtual machine communication interface by transmitting data associated with the virtual machine to the virtual machine communication interface.

4. The computer system of claim 1, wherein the virtual machine communication interface maintains a data store of virtual machines in the inactive state.

5. The computer system of claim 1, wherein the virtual machine communication interface is implemented as a pluggable module to an existing virtual machine infrastructure or as a software-defined network switch.

6. A non-transitory computer-readable medium to store a set of instructions that, when executed by a processor of a computer system, cause the computer system to:

implement a virtual machine communication interface;

host multiple virtual machines, the virtual machines being operable to communicate with the virtual machine communication interface;

utilize an agent to determine a period of inactivity of at least one virtual machine of the multiple virtual machines by monitoring system data according to a predetermined set of rules, the system data including CPU idle time and network activity on a port of the virtual machine;

utilize the agent to operate autonomously on the virtual machine to transition the at least one virtual machine from an active state to an inactive state after the period of inactivity of the at least one virtual machine; and transition the at least one virtual machine from the inactive state back to the active state when the virtual machine communication interface receives a data packet targeted for the at least one virtual machine;

if the data packet received by the virtual machine communication interface targets an inactive virtual machine, wherein the virtual machine is transitioned from the inactive state to the active state by causing the virtual machine communication interface to buffer the data packet and instruct a network resource to transition the virtual machine to the active state.

7. The non-transitory computer-readable medium of claim 6, wherein the virtual machine communication interface maintains a data store of virtual machines in the inactive state.

8. The non-transitory computer-readable medium of claim 6, further comprising instructions executable to cause the computer system to determine whether the data packet includes identifying data of the virtual machine stored in a data store.

9. The non-transitory computer-readable medium of claim 6, wherein the agent notifies the virtual machine communication interface before transitioning the virtual machine from the active state to the inactive state.

10. The non-transitory computer-readable medium of claim 9, wherein the agent notifies the virtual machine communication interface by transmitting data associated with the virtual machine to the virtual machine communication interface.

11. The non-transitory computer-readable medium of claim 6, wherein the virtual machine communication interface is implemented as a pluggable module to an existing virtual machine infrastructure or as a software-defined network switch.

12. A method for autonomously managing virtual machines, the method comprising:

implementing, by a processor of a computer system, a virtual machine communication interface;

hosting, by the processor, multiple virtual machines, the multiple virtual machines being operable to communicate with the virtual machine communication interface;

utilizing, by the processor, an agent to determine a period of inactivity of at least one virtual machine of the multiple virtual machines by monitoring system data of the at least one virtual machine according to a predetermined set of rules, the system data including CPU idle time and network activity on a port of the at least one virtual machine;

utilizing, by the processor, the agent to operate autonomously to transition the at least one virtual machine of the multiple virtual machines from an active state to an inactive state after a period of inactivity of the at least one virtual machine; and transitioning, by the processor, the at least one virtual machine from the inactive state back to the active state when the virtual machine communication interface receives a data packet identifying data targeted for the at least one virtual machine;

if the data packet received by the virtual machine communication interface targets an inactive virtual machine, wherein the processor causes the computer system to transition the virtual machine from the inactive state to the active state by causing the virtual machine communication interface to buffer the data packet and instruct a network resource to transition the virtual machine to the active state.

13. The method of claim 12, wherein transitioning the at least one virtual machine from the inactive state back to the active state includes determining whether the data packet includes identifying data of the at least one virtual machine stored in a data store.

14. The method of claim 12, wherein the agent notifies the virtual machine communication interface before transitioning the at least one virtual machine from the active state to the inactive state.

15. The method of claim 14, wherein the agent notifies the virtual machine communication interface by transmitting an identifier of the virtual machine to the virtual machine communication interface.

16. The computer system of claim 14, wherein the set of instructions includes instructions that, when executed by the processor, cause the computer system to:
   determine whether the data packet includes identifying data of the virtual machine stored in a data store, and
   in response to determining that the data packet includes the identifying data, causing the virtual machine to transition from the inactive state back to the active state.

17. The method of claim 10, wherein the virtual machine communication interface is implemented as a pluggable module to an existing virtual machine infrastructure or as a software-defined network switch, or as a network function virtualization module of the software-defined network switch.

18. The method of claim 10, wherein the predetermined set of rules includes different rules for triggering when respective virtual machines transition to the inactive state.

19. The non-transitory computer-readable medium of claim 6, wherein the predetermined set of rules includes different rules for triggering when respective virtual machines transition to the inactive state.

* * * * *